United States Patent [19]

Sluma et al.

[11] Patent Number: 5,290,448
[45] Date of Patent: Mar. 1, 1994

[54] POLYACRYLONITRILE MEMBRANE

[75] Inventors: Heinz-Dieter Sluma, Grossostheim; Jürgen Passlack, Ennepetal; Harald Schmitt, Laudenbach; Walter Löffelmann, Erlenbach; Karl Henke, Wuppertal, all of Fed. Rep. of Germany

[73] Assignee: Akzo NV, Arnhem, Netherlands

[21] Appl. No.: 988,285

[22] Filed: Dec. 9, 1992

[30] Foreign Application Priority Data

Dec. 14, 1991 [DE] Fed. Rep. of Germany ....... 4141267

[51] Int. Cl.$^5$ .................. B01D 61/24; B01D 69/08; B01D 71/42
[52] U.S. Cl. .................. 210/500.23; 210/500.43; 264/177.15
[58] Field of Search ............. 204/151; 210/500.23, 210/500.27, 500.42, 500.43; 264/41, 45.2, 165, 174, 176.1, 177.14, 177.15, 174, 178 F, DIG. 48, DIG. 62

[56] References Cited

U.S. PATENT DOCUMENTS

| | | |
|---|---|---|
| 3,600,491 | 8/1971 | Shimoda et al. |
| 3,674,628 | 7/1972 | Fabre |
| 3,871,950 | 3/1975 | Hashino et al. |
| 3,930,105 | 12/1975 | Christen et al. |
| 4,006,067 | 2/1977 | Gussack ............ 204/151 |
| 4,056,467 | 11/1977 | Christen et al. |
| 4,181,694 | 1/1980 | Hashino et al. |
| 4,234,431 | 11/1980 | Mishiro et al. |
| 4,252,652 | 2/1981 | Elfert et al. |
| 4,340,481 | 7/1982 | Mishiro et al. |
| 4,432,923 | 2/1984 | Reinehr et al. |
| 4,545,910 | 10/1985 | Marze |
| 4,564,488 | 1/1986 | Gerlach et al. |
| 5,039,420 | 8/1991 | Klein et al. |

FOREIGN PATENT DOCUMENTS

| | | |
|---|---|---|
| 465380A2 | 8/1992 | European Pat. Off. |
| 2740252 | 4/1978 | Fed. Rep. of Germany |
| 3214538 | 4/1983 | Fed. Rep. of Germany |
| 260868 | 10/1988 | Fed. Rep. of Germany |
| 262169 | 11/1988 | Fed. Rep. of Germany |
| 2047874 | 12/1980 | United Kingdom |

OTHER PUBLICATIONS

Neugebauer, W. Lorenz, "Histamine in Health and Disease," *Behring Inst. Mitt.*, No. 68, (1981), pp. 102-133.

Lorenz, W. et al., "Definition and Classification of the Histamine-Release Response to Drugs in Anaesthesia and Surgery: Studies in the Conscious Human Subject," *Klin. Wochenschr* (1982) 60:896-913.

Bonner, G. et al., "Hemodynamic Effects of Bradykinin on Systemic and Pulmonary Circulation in Healthy and Hypertensive Humans," *J. Cardiovascular Pharmacology*, 15 (Suppl. 6) (1990) S46-S56.

*Primary Examiner*—Frank Sever
*Attorney, Agent, or Firm*—Oliff & Berridge

[57] ABSTRACT

An asymmetric semipermeable membrane for dialysis and/or ultrafiltration is composed of a copolymer of acrylonitrile and acrylic ester and an ionic or ionizable monomer in the form of a hollow fiber. The copolymer is composed of 90.50 to 95.00 wt. % acrylonitrile, 4.99 to 8.60 wt. % acrylic ester, and 0.01 to 0.90 wt. % of the ionic or ionizable monomer. Also provided is a process for its manufacture.

21 Claims, 3 Drawing Sheets 1.00 μm 1.00μm 1.00μm

100μm

100μm

POLYACRYLONITRILE MEMBRANE

FIELD OF THE INVENTION

The invention relates to an asymmetric semipermeable membrane for dialysis and/or ultrafiltration composed of a copolymer of acrylonitrile and acrylic ester and an ionic or ionizable monomer in the form of a hollow fiber, as well as a process for its manufacture.

BACKGROUND OF THE INVENTION

U.S. Pat. No. 4,181,694 teaches a process for manufacturing hollow fibers from acrylonitrile polymers, with an acrylonitrile polymer composed of at least 60 wt. % acrylonitrile units being dissolved in an aqueous 65 to 95 wt. % nitrating acid (at 0° to 5° C.), to obtain a spinning solution. This solution is then extruded through spinnerets and an internal coagulation fluid is introduced at the same time. This process yields hollow fibers composed of an outer layer with a porous structure, a middle layer with so-called caverns, and an inner layer with a porous structure. These are doubly asymmetric membranes with a skin on both sides. The term "caverns" refers to "relatively large" holes in the membrane wall.

By analogy with the above patent, DE-PS 27 40 252 claims dried porous membranes with acrylonitrile polymer units composed of a carrier layer and a bilateral surface layer. A process for manufacturing this membrane having a skin on both outer surfaces is also claimed.

U.S. Pat. No. 4,545,910 claims membranes that exhibit the performance data of a conventional ultrafiltration membrane. The material for the membrane can be chosen from a plurality of materials, including polyacrylonitrile compounds.

Recently, U.S. Pat. No. 5,039,420 claims a membrane consisting of a copolymer of acrylonitrile and a $C_2$–$C_4$ hydroxyalkyl ester of methacrylic acid as comonomers.

However, the membranes manufactured according to the above processes exhibit only unsatisfactory values in certain areas as far as biocompatibility is concerned, for example in histamine release or bradykinin generation.

In the manufacture of synthetic, noncellulose membranes, for example those made of materials such as polyether sulfone, polyamide, or polyacrylonitrile compounds, a number of properties of the material that play a role in the future application of the membrane must be taken into account.

Therefore, a membrane of this kind, if it is to be used for dialysis, should exhibit or produce histamine release which is as low as possible. Increased histamine release in dialysis patients results in a number of unpleasant side effects, such as headache and pains in the limbs, as well as other painful conditions that have a negative effect on the state of health of the patient. Of course the limiting value for histamine release must be determined individually for each person. This value depends on a plurality of factors (age, sex, weight, etc.) and therefore cannot be expressed in general terms.

Histamine is a biologically highly active substance. Therefore, its excessive release must be avoided at all costs. See the papers by E. Neugebauer et al., *Behring Inst. Mitt.*, No. 68, pp. 102-133, 1981 and W. Lorenz et al., *Klin. Wochenschr.* Vol. 60, p. 896-913, 1982.

In addition, a membrane of this kind should exhibit values that are as low as possible for bradykinin generation. Bradykinin generation is also associated with unpleasant side effects that could pose a risk to dialysis patients. (G. Bônner et al., *J. of Cardiovasc. Pharm.* Vol. 15 (Suppl. 6), pp. 46-56, 1990). Although the clinical significance of bradykinin generation like that of histamine release has not yet been completely studied, an attempt should be made to avoid bradykinin generation whenever possible during dialysis, as it is triggered by a large quantity of sulfonate compounds in the membrane as a result of so-called "contact activation."

SUMMARY OF THE INVENTION

An object of the present invention is therefore to provide a membrane in which the value for histamine release is as small as possible and which triggers no contact activation if possible.

It is also an object of the present invention to provide a suitable process for manufacturing a membrane of this kind, in such fashion that in this process, the layer thickness of the skin and the composition of the membrane support can be controlled by simply adjusted parameters.

DETAILED DESCRIPTION OF PREFERRED EMBODIMENTS

Figure 1:
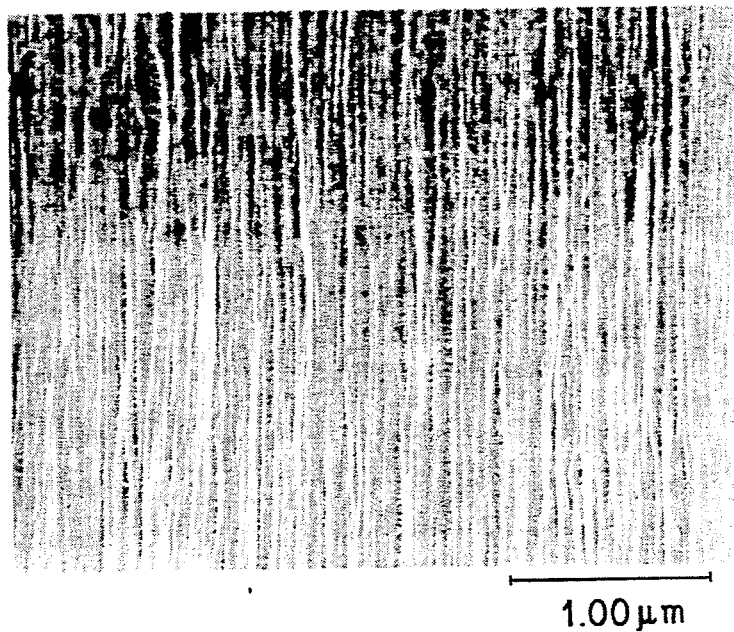
FIG. 1 shows an electron photomicrograph of the surface of the inside wall of a membrane according to the invention in the initial state (scale 27,000:1).
Figure 2:
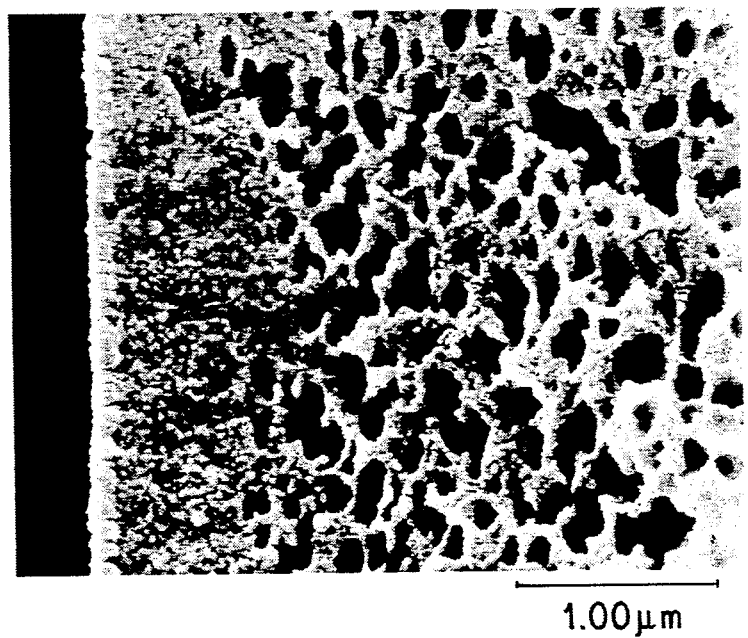
FIG. 2 shows the same membrane as in FIG. 1, specifically the area of the break on the inner edge side (scale 27,000:1).
Figure 3:
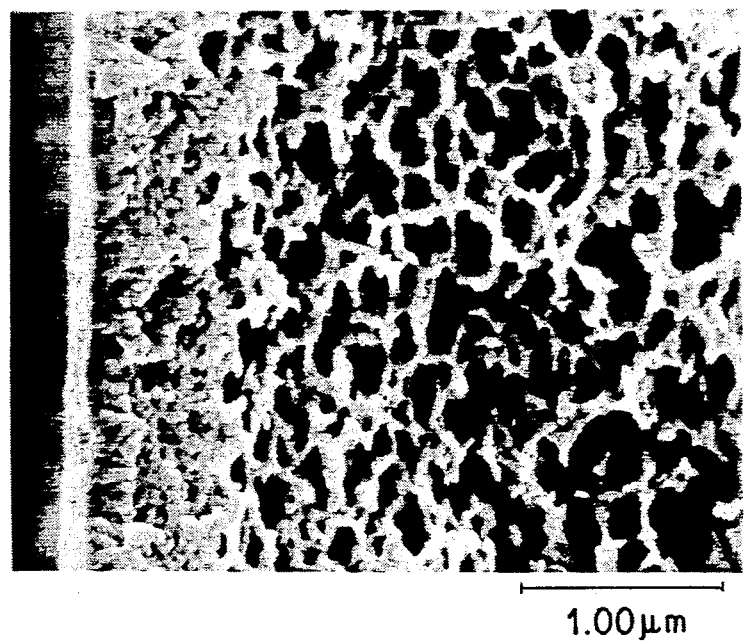
FIG. 3 shows the same break area on the inside edge of FIG. 2, after freeze-drying (scale 27,000:1).
Figure 4:
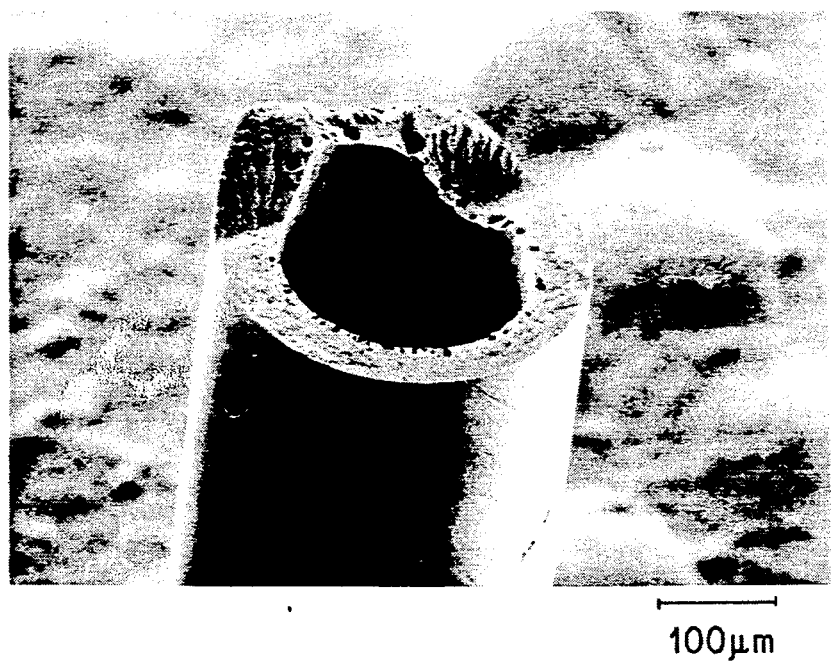
FIG. 4 shows a membrane not according to the invention, for example according to Example 6. The 150× enlargement shows definite caverns in the carrier layer.
Figure 5:
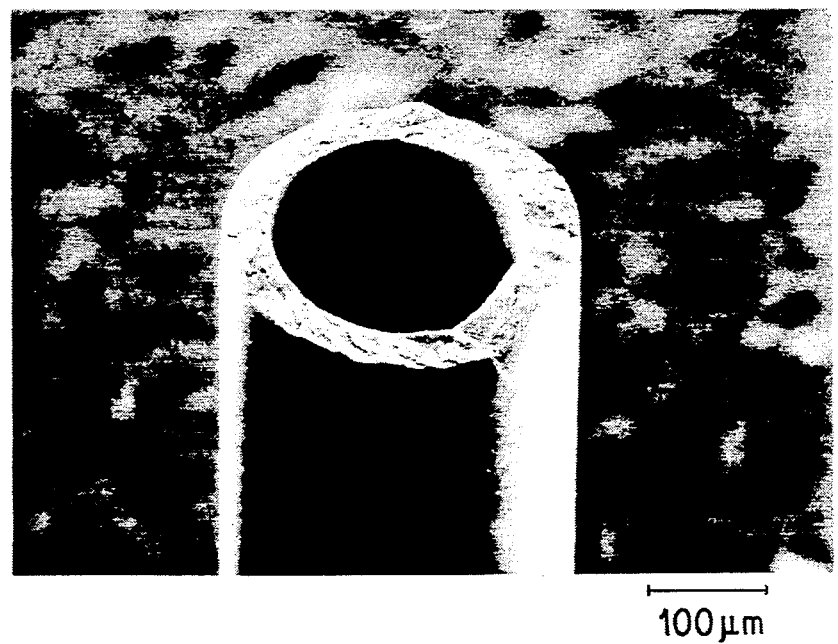
FIG. 5. (in contrast to FIG. 4) shows a membrane according to the invention, of Example 2 with the same enlargement. No caverns can be seen.

The above and other objects of the present invention are achieved by an asymmetric semipermeable membrane for dialysis and/or ultrafiltration composed of a copolymer of acrylonitrile and acrylic ester and an ionic or ionizable monomer in the form of a hollow fiber. The copolymer is composed of 90.50 to 95.00 wt. % acrylonitrile, 4.99 to 8.60 wt. % acrylic ester, and 0.01 to 0.90 wt. % of ionic or ionizable monomer. The membrane has a skin on the inside of the cavity, has no pore radius gradients above the skin, and likewise contains no macrovoids above the skin. Macrovoids are "holes" in the membrane which among other things cause the membrane to have a significantly lower mechanical stability.

Preferably the thickness of the skin on the inside of the cavity is 0.1 to 2.0 microns.

Preferably the composition of the copolymer is 92.3 to 94.1 wt. % acrylonitrile, 5.5 to 7.0 wt. % acrylic ester and 0.4 to 0.7 wt. % of the ionic or ionizable monomer.

In structuring the invention, the ionic or ionizable monomer is chosen from the group of methallylsulfonic acids.

The membrane preferably has a surface potential of $-1$ volt to $+1$ volt.

In a particular embodiment of the invention, the membrane is gas-tight. The term "gas-tight" is defined according to the invention as gas tightness relative to the passage of nitrogen. The following standardized test method is used to test gas tightness: a dry bundle of hollow fiber membranes according to the invention is dipped in a bath containing propanol and $N_2$ is passed through the lumen at various pressure levels (up to a maximum of 3.5 bars). If no gas bubbles appear, the membrane is considered gas-tight.

The objects of the invention are likewise achieved by a process for manufacturing an asymmetric semipermeable membrane using the wet spinning method and using as the starting polymer, a copolymer composed of 90.50 to 95.00 wt. % acrylonitrile, 4.99 to 8.60 wt. % acrylic ester, and 0.01 to 0.9 wt. % of the ionic or ionizable monomer.

The spinning solution is composed of:
18 to 24 wt. % polymer,
70 to 80 wt. % of an aprotic solvent, and
0 to 7 wt. % water;
the interior filling is composed of:
10 to 40 wt. % of an aprotic solvent;
50 to 85 wt. % glycerine, and
2 to 12 wt. % water; and
the precipitation bath is composed of:
75 to 85 wt. % of an aprotic solvent,
15 to 25 wt. % water,
less than 3 wt. % glycerine.
Spinning is performed at 60° to 90° C., whereby:
the temperature of the precipitation bath is 60° to 90° C.,
the ratio of the spinneret exit speed of the spinning solution to the pull-off speed of the hollow fiber to the precipitation bath is 1:0.6 to 1:2.5,
a single- or multi-stage stretching takes place (1 1.1 to 1:2.5),
followed by relaxation at 65° to 75° C.,
and followed by tempering likewise at the same temperature, followed by treatment in a softener bath in a mixture of glycerine and water, and, after winding, the package is processed further in the usual fashion.

The aprotic solvent can be chosen from the group composed of dimethylacetamide, dimethylformamide, N-methylpyrrolidone, or dimethylsulfoxide.

The preferred spinning temperature, like the preferred precipitation bath temperature, is 75° to 85° C.

Preferably the ratio between the spinneret exit speed of the spinning solution and the pull-off speed of the hollow fiber from the precipitation bath is 1:0.7 to 1:1.7.

In one embodiment of the invention, the difference between the precipitation bath temperature and the spinning temperature is less than 5° C.

Preferably, winding takes place on a round reel with a crossing angle of 0° to 20° C., based on the lengthwise axis.

In another embodiment of the invention, after winding, the packages are cut in the wet state and the resultant segments are wound up in the wet state and then dried.

EXAMPLES

For the following examples, the copolymer for the spinning solution consists of 13.5 wt. % polyacrylonitrile, 6 wt. % methacrylate, and 0.5 wt. % sodium methallylsulfonate.

EXAMPLE 1

A spinning solution composed of 22 wt. % of the copolymer and 78 wt. % dimethylsulfoxide (DMSO) is extruded through a commercial annular slit nozzle. A solution of 15 wt. % DMSO, 81 wt. % glycerine, and 4 wt. % water is simultaneously added as an internal filling to the cavity of the hollow fiber that is forming. The temperature of the spinneret is 75° C. The hollow fiber is precipitated in a precipitation bath with a composition of 80 wt. % DMSO and 20 wt. % water at 80° C. and then drawn out of the precipitation bath at a rate of 22 m/minute. After washing at 40° C., the fiber is stretched at a rate of 43 m/min at 70° C., then relaxed at a rate of 41 m/min also at 70° C. and then tempered at the same temperature. Post-treatment is conducted in a bath composed of 25 wt. % glycerine and 75 wt. % water. After winding and cutting, the fiber is dried at 77° C. for 20 minutes.

The result is a hollow fiber membrane with an internal diameter of 216 microns and an outside diameter of 292 microns.

The properties of the membrane are measured on bundles of 100 hollow fibers each, with the hollow fibers being subjected to internal flow in the permeability measurements.

To measure the ultrafiltration rate of albumen/cytochrome C solution, an aqueous, phosphate-buffered sodium chloride solution is used, containing 50 g of albumen, 0.1 g cytochrome C, and 0.03 sodium dithionate per liter of solution.

The hollow fiber has the following characteristics:

| | |
|---|---|
| Ultrafiltration rate with water: | 87 ml/(m$^2$h mm Hg) |
| Ultrafiltration rate with albumin/cytochrome C solution: | 21 ml/(m$^2$h mm Hg) |
| Albumin screen coefficient: | 0.00 |
| Cytochrome C screen coefficient: | 0.59 |
| Dialytic permeability for vitamin B12: | 12.7 × 10$^{-3}$ cm/min |
| Dialytic permeability for creatinine: | 44.6 × 10$^{-3}$ cm/min |

EXAMPLE 2

The process described in Example 1 is repeated, using however a polymer spinning solution of 22 wt. % copolymer, 75 wt. % DMSO, and 3 wt. % water as well as an internal filling fluid composed of 30 wt. % DMSO, 62 wt. % glycerine, and 8 wt. % water.

All the other parameters are set the same as Example 1, but the pull-off rate from the precipitation bath is 12 m/min and stretching is conducted at 21.5 m/min. Relaxation is 20.5 m/min.

The hollow fibers in the membrane obtained in this fashion have an outside diameter of 288 microns and an inside diameter of 216 microns. The following performance data are measured on the hollow fibers:

| | |
|---|---|
| Ultrafiltration rate with water: | 149 ml/(m$^2$h mm Hg) |
| Ultrafiltration with albumin/cytochrome C solution: | 27 ml/(m$^2$h mm Hg) |
| Albumin screen coefficient: | 0.00 |
| Cytochrome C screen coefficient: | 0.70 |
| Dialytic permeability for vitamin B12: | 16.0 × 10$^{-3}$ cm/min |
| Dialytic permeability for creatinine: | 48.6 × 10$^{-3}$ cm/min |

EXAMPLE 3

Example 3 is performed under the same conditions and parameters as Example 2. Only the pull-off rate from the precipitation bath is increased to 15 m/min.

The hollow fiber membrane thus obtained has an outside diameter of 268 microns and an inside diameter of 208 microns.

It has the following characteristics:

| | |
|---|---|
| Ultrafiltration rate with water: | 273 ml/(m²h mm Hg) |
| Ultrafiltration with albumin/cytochrome C solution: | 13 ml/(m²h mm Hg) |
| Albumin screen coefficient: | 0.00 |
| Cytochrome C screen coefficient: | 0.61 |
| Dialytic permeability for vitamin B12: | $7.3 \times 10^{-3}$ cm/min |
| Dialytic permeability for creatinine: | $32.5 \times 10^{-3}$ cm/min |

The above exemplified three membranes according to the invention are therefore highly suitable for dialysis.

They also differ from previously known polyacrylonitrile membranes by having very low values for histamine release and bradykinin generation.

EXAMPLE 4 (COMPARISON EXAMPLE)

In this example, a composition not according to the invention is used for internal filling.

Procedure

A spinning solution composed of 20 wt. % copolymer, 76 wt. % DMSO, and 4 wt. % water is extruded through an annular slit nozzle as in Example 1 and an internal filling liquid composed of 88% DMSO, 10 wt. % glycerine, and 10 wt. % water is introduced simultaneously into the forming hollow fibers. The nozzle temperature is 55° C. The hollow fiber is precipitated in a precipitation bath with a composition of 74 wt. % DMSO and 26 wt. % water at 80° C. and pulled out of the precipitation bath at a rate of 15 m/min.

Washing is performed at 40° C., followed by stretching (at 22 m/min), relaxation (at 21 m/min) and tempering at 70° C.

The post-treatment bath is composed of 42 wt. % glycerine and 58 wt. % water. Subsequent drying is performed at 66° C. (20 minutes).

The resultant membrane, with an outside diameter of 270 microns and an inside diameter of 216 microns has no skin on the inside. As the following performance data show, a microporous membrane (not according to the invention) is obtained.

| | |
|---|---|
| Ultrafiltration rate with water: | 1583 ml/(m²h mm Hg) |
| Ultrafiltration with albumin/cytochrome C solution: | 680 ml/(m²h mm Hg) |
| Albumin screen coefficient: | 0.86 |
| Cytochrome C screen coefficient: | 1.00 |

EXAMPLE 5 (COMPARISON EXAMPLE)

In this example, as in Example 4, the composition not according to the present invention is used as the internal filling. In addition, no stretching takes place, which is not according to the invention.

Procedure

A spinning solution with the composition 22 wt. % copolymer, 75 wt. % DMSO, and 3 wt. % water is extruded through the same nozzle as in Example 4 (nozzle temperature: 80° C.) and an internal filling fluid composed of 5 wt. % DMSO, 90 wt. % glycerine, and 5 wt. % water is introduced simultaneously into the cavity of the forming hollow thread. The thread is pulled out of the precipitation bath at a rate of 15 m/min and washed at 40° C. Then it is neither stretched nor relaxed; there is only tempering at 70° C. After tempering, aftertreatment is performed as in Example 4 and the fiber bundle is then dried for 20 minutes at 77° C.

The resultant hollow fiber has a tight structure without a microporous carrier layer. The outside diameter is 284 microns and the inside diameter 224 microns.

As the following data indicate, the membrane thus produced not according to the invention cannot be used in a practical application and for example exhibits a dialytic permeability that is much too low:

| | |
|---|---|
| Ultrafiltration rate with water: | 3 ml/(m²h mm Hg) |
| Ultrafiltration with albumin/cytochrome C solution: | 0.1 ml/(m²h mm Hg) |
| Albumin screen coefficient: | 0.00 |
| Cytochrome C screen coefficient: | 0.01 |
| Dialytic permeability for vitamin B12: | $2.4 \times 10^{-3}$ cm/min |
| Dialytic permeability for creatinine: | $11.5 \times 10^{-3}$ cm/min |

EXAMPLE 6 (COMPARISON EXAMPLE)

As in Examples 4 and 5, the internal filling has a composition that is not according to the invention.

Procedure

A spinning solution as in Example 2 is extruded through an annular slit nozzle as in Example 1 and an internal filling composed of 30 wt. % DMSO, 56 wt. % glycerine, and 14 wt. % water is introduced simultaneously into the forming hollow fiber. The temperature of the nozzle is 80° C. The hollow fiber is precipitated in a precipitation bath with a composition of 80 wt. % DMSO and 20 wt. % water and pulled from the precipitation bath at a rate of 15 m/min. After washing at 40° C. the fiber is stretched (21 m/min) and relaxed (20 m/min) then tempered at 70° C.

Post-treatment takes place in a bath composed of 30 wt. % glycerine and 70 wt. % water, and the last step, drying, is performed as in Example 5.

The resultant hollow fiber with an outside diameter of 282 microns and an inside diameter of 216 microns has caverns in the carrier layer. A composition of the internal filling not according to the invention therefore leads to a membrane which is not according to the invention.

The performance data listed below also show that the membrane, because of the low separating power in the range from 10–70,000 Daltons cannot be used for conventional applications.

| | |
|---|---|
| Ultrafiltration rate with water: | 489 ml/(m²h mm Hg) |
| Ultrafiltration with albumin/cytochrome C solution: | 99 ml/(m²h mm Hg) |
| Albumin screen coefficient: | 0.72 |
| Cytochrome C screen coefficient: | 0.87 |
| Dialytic permeability for vitamin B12: | $11.6 \times 10^{-3}$ cm/min |
| Dialytic permeability for creatinine: | $39.4 \times 10^{-3}$ cm/min |

While this invention has been described in conjuction with specific embodiments and examples thereof, it is evident that many alternatives, modifications and variations will be apparent to those skilled in the art. Accordingly, the preferred embodiments of the invention and the examples as set forth herein are intended to be illustrative, not limiting. Various changes may be made without departing from the spirit and scope of the invention as defined in the following claims.

What is claimed is:

1. An asymmetric semipermeable membrane for dialysis or ultrafiltration comprised of:
    a copolymer of acrylonitrile and acrylic ester and an ionic or ionizable monomer in the form of a hollow fiber defining a cavity, said copolymer having properties for enabling substantial avoidance of bradykinin generation and being comprised of 90.50 to 95.00 wt. % acrylonitrile, 4.99 to 8.60 wt. % acrylic ester, and 0.01 to 0.90 wt. % of ionic or ionizable monomer.

2. An asymmetric semipermeable membrane according to claim 1, wherein the membrane has a skin on the inside of the cavity, no pore radius gradient above the skin, and no macrovoids above the skin.

3. An asymmetric semipermeable membrane according to claim 2, wherein the skin has a thickness of 0.1 to 2.0 microns on the inside of the cavity.

4. An asymmetric semipermeable membrane according to claim 1, wherein the copolymer is comprised of 92.3 to 94.1 wt. % acrylonitrile, 5.5 to 7 wt. % acrylic ester, and 0.4 to 0.7 wt. % of ionic or ionizable monomer.

5. An asymmetric semipermeable membrane according to claim 1, wherein the ionic or ionizable monomer is selected from the group consisting of methyallylsulfonic acids.

6. An asymmetric semipermeable membrane according to claim 1, wherein the membrane has a surface potential of −1 volt to +1 volt.

7. An asymmetric semipermeable membrane according to claim 1, wherein the membrane is gas-tight.

8. A process for manufacturing an asymmetric semipermeable membrane according to claim 1 by a wet spinning method comprised of the steps of:
    forming a hollow fiber by spinning a solution comprised of 18 to 24 wt % copolymer, 70 to 80 wt. % aprotic solvent, and 0 to 7 wt. % water through a nozzle, said copolymer being comprised of 90.50 to 95.00 wt. % acrylonitrile, 4.99 to 8.60 wt. % acrylic ester, and 0.01 to 0.90 wt. % of an ionic or ionizable monomer;
    simultaneously adding a solution comprised of 10 to 40 wt. % aprotic solvent, 50 to 85 wt. % glycerine and 2 to 12 wt. % water as an internal filling to the hollow fiber;
    precipitating the hollow fiber into a precipitation bath comprised of 75 to 85 wt. % aprotic solvent, 15 to 25 wt. % water and less than 3 wt. % glycerine;
    pulling off the hollow fiber from the precipitation bath; and
    single or multistage stretching (1:1.1 to 1:2.5) the hollow fiber.

9. A process according to claim 8, wherein a ratio of nozzle exit rate of the spinning solution to pull-off rate of the hollow fiber from the precipitation bath is from 1:0.6 to 1:2.5.

10. A process according to claim 9, wherein the ratio of the nozzle exit rate of the spinning solution to the pull-off rate of the hollow fiber from the precipitation bath is 1:1.7 to 1:1.2.

11. A process according to claim 8, wherein spinning is performed at 60° to 90° C. and a temperature of the precipitation bath is 60° to 90° C.

12. A process according to claim 11, wherein stretching the hollow fiber is followed by relaxing the hollow fiber at 65° to 75° C.

13. A process according to claim 12, wherein relaxing the hollow fiber is followed by tempering the hollow fiber at 65° to 75° C.

14. A process according to claim 13, wherein tempering the hollow fiber is followed by treating the hollow fiber with a softener bath comprised of a mixture of glycerine and water.

15. A process according to claim 14, wherein treating the hollow fiber is followed by winding the hollow fiber to form a package.

16. A process according to claim 15, wherein the winding is performed on a round reel having a lengthwise axis with a crossing angle of 0° to 20°, relative to the lengthwise axis.

17. A process according to claim 15, wherein prior to winding, the package is cut in a wet state into segments and the segments are wound in the wet state, whereupon drying occurs.

18. A process according to claim 11, wherein the step of spinning is performed at 75° to 85° C.

19. A process according to claim 11, wherein the temperature of the precipitation bath is 75° to 85° C.

20. A process according to claim 11, wherein the difference between the precipitation bath temperature and the spinning temperature is less than 5° C.

21. A process according to claim 8, wherein the aprotic solvent is selected from the group consisting of dimethylformamide, dimethylacetamide, N-methylpyrrolidone, and dimethylsulfoxide.

* * * * *

UNITED STATES PATENT AND TRADEMARK OFFICE
CERTIFICATE OF CORRECTION

PATENT NO. : 5,290,448

DATED : March 1, 1994

INVENTOR(S) : Heinz-Dieter SLUMA et al.

It is certified that error appears in the above-identified patent and that said Letters Patent is hereby corrected as shown below:

Column 3, line 33, change "(1 1.1 to" to --(1:1.1 to--.

Column 6, line 66, change "conjuction" to --conjunction--.

Column 7,(Claim 5, line 3) line 32, change "methyallylsul-" to --methylallylsul- --.

Signed and Sealed this

Fifth Day of July, 1994

BRUCE LEHMAN

*Attest:*

*Attesting Officer*  *Commissioner of Patents and Trademarks*